US006130682A

United States Patent [19]

Kohno et al.

[11] Patent Number: 6,130,682

[45] Date of Patent: *Oct. 10, 2000

[54] INK JET RECORDING APPARATUS WITH DETECTION OF DISCHARGE MALFUNCTION

[75] Inventors: Takeshi Kohno, Kawasaki; Atsushi Saito; Keizo Sasai, both of Yokohama; Hiroshi Ogushi, Shiroi-machi; Fumihiko Nakamura, Tokyo; Katsumi Obana, Funabashi; Takayuki Nishinohara, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/670,205

[22] Filed: Jun. 20, 1996

[30] Foreign Application Priority Data

Jun. 21, 1995 [JP] Japan .................................... 7-154658

[51] Int. Cl.[7] ......................... B41J 29/393; H04N 1/034; B41S 2/21

[52] U.S. Cl. .................................. 347/19; 347/3; 347/43; 358/504

[58] Field of Search ................................. 347/19, 23, 43, 347/79, 3; 358/504

[56] References Cited

U.S. PATENT DOCUMENTS

| | | | |
|---|---|---|---|
| 4,313,124 | 1/1982 | Hara | 347/57 |
| 4,329,708 | 5/1982 | Yamamoto et al. | 348/617 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,492,966 | 1/1985 | Seki et al. | 346/33 A |
| 4,549,227 | 10/1985 | Hashimoto et al. | 386/23 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,862,292 | 8/1989 | Enari et al. | 360/8 |
| 5,182,650 | 1/1993 | Inoue et al. | 358/296 |
| 5,430,306 | 7/1995 | Ix | 250/573 |
| 5,627,571 | 5/1997 | Anderson et al. | 347/19 |

FOREIGN PATENT DOCUMENTS

| | | |
|---|---|---|
| 0 110 634 | 6/1984 | European Pat. Off. . |
| 0 443 832 | 8/1991 | European Pat. Off. . |
| 0 447 262 | 9/1991 | European Pat. Off. . |
| 0 500 281 | 8/1992 | European Pat. Off. . |
| 0 562 786 | 9/1993 | European Pat. Off. . |
| 0 660 583 | 6/1995 | European Pat. Off. . |
| 32 46 707 | 6/1984 | Germany . |
| 2-215539 | 8/1990 | Japan . |
| 6-125470 | 5/1994 | Japan . |
| 6-276330 | 9/1994 | Japan . |

*Primary Examiner*—John Barlow
*Assistant Examiner*—Craig A. Hallacher
*Attorney, Agent, or Firm*—Fitzpatrick, Cella, Harper & Scinto

[57] ABSTRACT

An ink jet recording apparatus has a recording mode in which recording is performed by selectively discharging black ink and color inks of colors other than black. Any abnormality in the state of discharge of the ink is performed by executing a test discharging operation. When the recording apparatus functions as a facsimile apparatus, the test discharging operation is conducted by discharging only the black ink, without discharging inks of other colors. Wasteful consumption of ink is diminished, so that the running cost of the ink jet recording apparatus is reduced.

37 Claims, 7 Drawing Sheets

INK JET RECORDING APPARATUS WITH DETECTION OF DISCHARGE MALFUNCTION

BACKGROUND OF THE INVENTION

1. Field of the Invention

The present invention relates to an ink jet recording apparatus and, more particularly, to an ink jet recording apparatus for use in, for example, a facsimile apparatus and having means for detecting any extraordinary ink discharge.

2. Description of Related Art

A conventional recording apparatus used on a facsimile apparatus will be described with specific reference to FIG. 7. A plurality of recording paper sheets P are stacked and held on a cassette 151. The sheets are fed one-by-one by a sheet feed roller 152 to a delivery roller 153 so as to be further delivered to a recording portion B. The recording portion B is of an ink jet recording type and is equipped with a recording head having an array of a multiplicity of nozzles, e.g., 128 nozzles, for performing scanning in a main-scan direction. In operation, ink is jetted from these nozzles so as to record an image on the upper face of the recording paper sheet P as viewed in FIG. 7. After the recording, the recording paper sheet P is conveyed to an eject section along a lower guide 155 by means of a pair of sheet discharge rollers 154 arranged downstream of the recording portion B and is further ejected by means of a sheet eject roller 156 cooperating with an idle roller 157 so as to be ejected to an ejected sheet stacker 158. Successive recording paper sheets thus ejected are stacked on the ejected sheet stacker 158.

The recording head is a cartridge-type head unit which incorporates an ink tank, so that the whole recording head is replaced with a new head when the ink in the ink tank has been consumed. In order to enable color recording while realizing a more compact construction of the whole recording apparatus, the apparatus is designed to mount either of a cartridge for recording in black color and a cartridge for color recording. The carriage for recording in black (referred to as "black recording cartridge", hereinafter) has 128 nozzles which discharge only black ink. In contrast, the carriage for color recording (referred to as "color recording cartridge", hereinafter) has 64 nozzles for black ink and 24 nozzles for each of three primary colors of yellow, cyan and magenta, as well as ink tanks for inks of these four colors. The configuration and the dimensions of the color recording cartridge are the same as those of the black recording cartridge. Thus, the amount of the ink of each color held in the color recording head is not greater than ¼ that of the black ink held in the black recording cartridge.

Recording apparatuses have been proposed which perform recording on a variety of types of recording mediums such as paper sheets, OHP transparency sheets, and so forth. Among these recording apparatuses, particularly regarded as being useful and promising is the ink jet recording apparatus which performs recording with reduced running cost and at low level of noise by directly jetting ink onto a recording medium.

Use of an ink jet recording apparatus as the recorder in a facsimile apparatus essentially requires detection of any factor or condition of printing failure such as shortage of ink and inferior discharge of ink, in order that the information received by the facsimile apparatus is recorded without fail. Such detection can be realized by a system having a transmissive-type photo-sensor incorporating a light-emitting element and a light-receiving element. In operation of this detection system, a predetermined number of ink droplets are ejected past the space between the light-emitting element and the light-receiving element so that droplets interrupt the light to be received by the light-receiving element so as to cause a change in the level of the sensor output. Any extraordinary state of ink discharge due to reduction in the amount of ink remaining in the ink supply system or a trouble in the head can be detected by checking the sensor output.

The transmissive-type photo-sensor has a lens which is formed integrally with the light-emitting surface of the light-emitting element so that a substantially collimated light beam is projected towards the light-receiving element. Meanwhile, a molded member is provided on the light-receiving surface of the light-receiving element and a fine aperture of a size on the order of 0.7 mm tall and 0.7 mm wide is formed in the molded member in alignment with the optical axis, so that a linear detectable range of about 0.7 mm tall and 0.7 mm wide is defined over the entire region between the light-emitting element and the light-receiving element. The optical axis along which the light-emitting and light receiving elements are optically coupled together extends in parallel with the nozzle array on the recording head, and the distance between the light-emitting and light-receiving elements is greater than the span of the nozzle array. Therefore, when the photo-sensor is mounted such that the optical axis coincides with the line along which the nozzle array extends, ink droplets discharged by any nozzle of the nozzle array fly across the above-mentioned detectable region between the light-emitting and light-receiving elements. The droplets which intersects the detectable region interrupt the light from the light-emitting element so that the quantity of light reaching the light-receiving element is reduced, thus causing a change in the level of the output derived from the light-receiving element. When the amount of change in the output level observed exceeds a predetermined level, the discharging condition is judged as being normal, otherwise the discharging condition is judged as being extraordinary and defective. When such an extraordinary state is found, the apparatus suspends further recording operation and takes necessary measures such as prohibition of receipt of facsimile message or storage of received facsimile data in a memory, until a suitable recovery operation is performed by, for example, applying suction vacuum to the nozzles to recover the normal ink jetting condition.

The above-described detection system is considered practical and effective because it enables detection of any extraordinary state of ink discharge without requiring any expensive components to be added to the recording head.

Basically, the above-described operation for detecting any ink discharge failure is conducted on all the nozzles of the recording head, upon completion of recording on each of successive recording sheets.

The technique described above, however, has the following problem. It is to be noted that the position of the optical axis of the transmissive-type photo-sensor tends to fluctuate with respect to the path of the discharged ink droplets in the main-scan direction, due to mechanical or dimensional error incurred in the course of fabrication of the apparatus. It is therefore necessary to consecutively discharge the ink over a range wide enough to cover the above-described detectable region, so as to accommodate the fluctuation of the position of the optical axis with respect to the path of the ink droplets. Consequently, the amount of the ink to be spent for the detection of any ink discharge failure is as large as 2% of the total ink consumption, assuming that 75 droplets are discharged from 128 nozzles and that a standard text to be printed has a black-to-white ratio of 4%. This obviously leads to an increase in the running cost. A demand therefore exists for reducing the amount of the ink to be consumed for the purpose of detection of the ink discharge failure from the nozzles of the recording head.

As stated before, a color printer is available which can selectively mount either a black recording cartridge and a color recording cartridge. When this type of color printer is used as the printing means of a facsimile apparatus, it is quite possible that the facsimile apparatus receives data while the printer still carries the color recording cartridge. Detection of ink discharge failure has to be conducted even when the cartridge present on the facsimile apparatus is the color recording cartridge. Despite the fact that the received data can be printed with the black ink alone, all the nozzles on the recording head, including nozzles for different color inks, have to be checked for any discharge failure in the same sequence as that performed on the black recording cartridge. This leads to a serious rise of the running cost. Moreover, since the capacity of the ink tank for each color is small in the color recording cartridge, frequent exchange of the cartridge is required because the ink is consumed away shortly due to repeated discharge failure detecting operation. In addition, a large volume of ink absorber such as of felt has to be installed in order to absorb and retain the ink which has been discharged for the purpose of the detection of ink discharge failure, making it difficult to cope with the demand for the reduction in the cost and the size of the apparatus.

SUMMARY OF THE INVENTION

Accordingly, an object of the present invention is to provide an ink jet recording apparatus which diminishes wasteful use of ink so as to reduce the running cost, thereby overcoming the above-described problem of the known apparatus.

To this end, according to one aspect of the present invention, there is provided an ink jet recording apparatus having a recording portion which performs recording by discharging at least one of black ink and a color ink of a color other than black onto a recording medium, comprising: discharge failure detecting means for executing a detecting operation by detecting any abnormality in a state of ink discharge from the recoring portion; and control means for controlling the discharge failure detecting means to execute the detecting operation when the recording portion is in a state for performing the recording operation by using the black ink alone, while prohibiting execution of the detecting operation when the recording portion is in a state for performing the recording operation by using at least the color ink of the color other than black.

According to another aspect of the present invention, there is provided an ink jet recording apparatus for recording on a recording medium by using at least a color recording portion which discharges black ink and a color ink of a color other than black onto the recording medium, comprising: receiving means for receiving image data transmitted from a device which does not store the image data after transmission; image data recording means for driving the color recording portion based on the image data received by the receiving means, thereby performing the recording in a recording operation; determining means for determining whether or not a recording mode is a mode for performing recording by the image data recording means; and control means for controlling the recording operation such that, when the determining means has determined that the recording mode is the mode for performing recording by the image data recording means, the recording operation by the image data recording means is executed by causing the color recording portion to discharge the black ink alone.

In accordance with the first aspect of the present invention, a test discharging operation for detecting any ink discharge failure is executed in a system which enables recording with black ink supplied from an ink tank containing the black ink and at least one type of color ink other than black supplied from a color ink tank having a capacity smaller than that of the black ink tank, only when the system is in a state for performing recording using the black ink alone, whereas, when the system is in a state in which recording is performed using the at least one type of color ink other than black, the test discharging operation for detecting any ink discharge failure is prohibited. Consequently, the amount of ink to be used for the test discharging operations is reduced to prolong the interval of replacement or renewal of the recording cartridge. It is therefore possible to reduce the running cost and to reduce the size of the above-mentioned ink absorber and, hence, the size of the whole recording apparatus.

In accordance with the second aspect of the invention, even when a color recording cartridge is used on a facsimile apparatus, the recording of data received through facsimile communication is conducted by selectively using black ink alone, and the test discharging operation for finding any ink discharge failure is executed only in regard to the discharge of the black ink, whereby wasteful consumption of the ink is minimized.

According to yet another aspect of the present invention, an ink jet recording apparatus includes detecting means for detecting discharge failure of a mounted recording device in a detecting operation, and control means for controlling the detecting operation. The control means controls the mounted recording device to eject only black ink during the detecting operation, regardless of whether the mounted recording device is a black recording device for ejecting black ink or a color recording device for ejecting black ink and at least one other ink of a color other than black.

According to still another aspect of the present invention, an ink jet recording method includes the steps of detecting discharge failure of a mounted recording device in a detecting operation, and controlling the detecting operation. The mounted recording device is controlled to eject only black ink during the detecting operation regardless of whether the mounted recording device is a black recording device for ejecting black ink or a color recording device for ejecting black ink and at least one other ink of a color other than black.

The above and other objects, features and advantages of the present invention will become clear from the following description of the preferred embodiments when the same is read in conjunction with the accompanying drawings.

DESCRIPTION OF THE PREFERRED EMBODIMENTS

An embodiment of the ink jet recording apparatus of the present invention will be described with reference to the drawings, on an assumption that the recording apparatus is used as the recording means of a facsimile apparatus.

Figure 1:
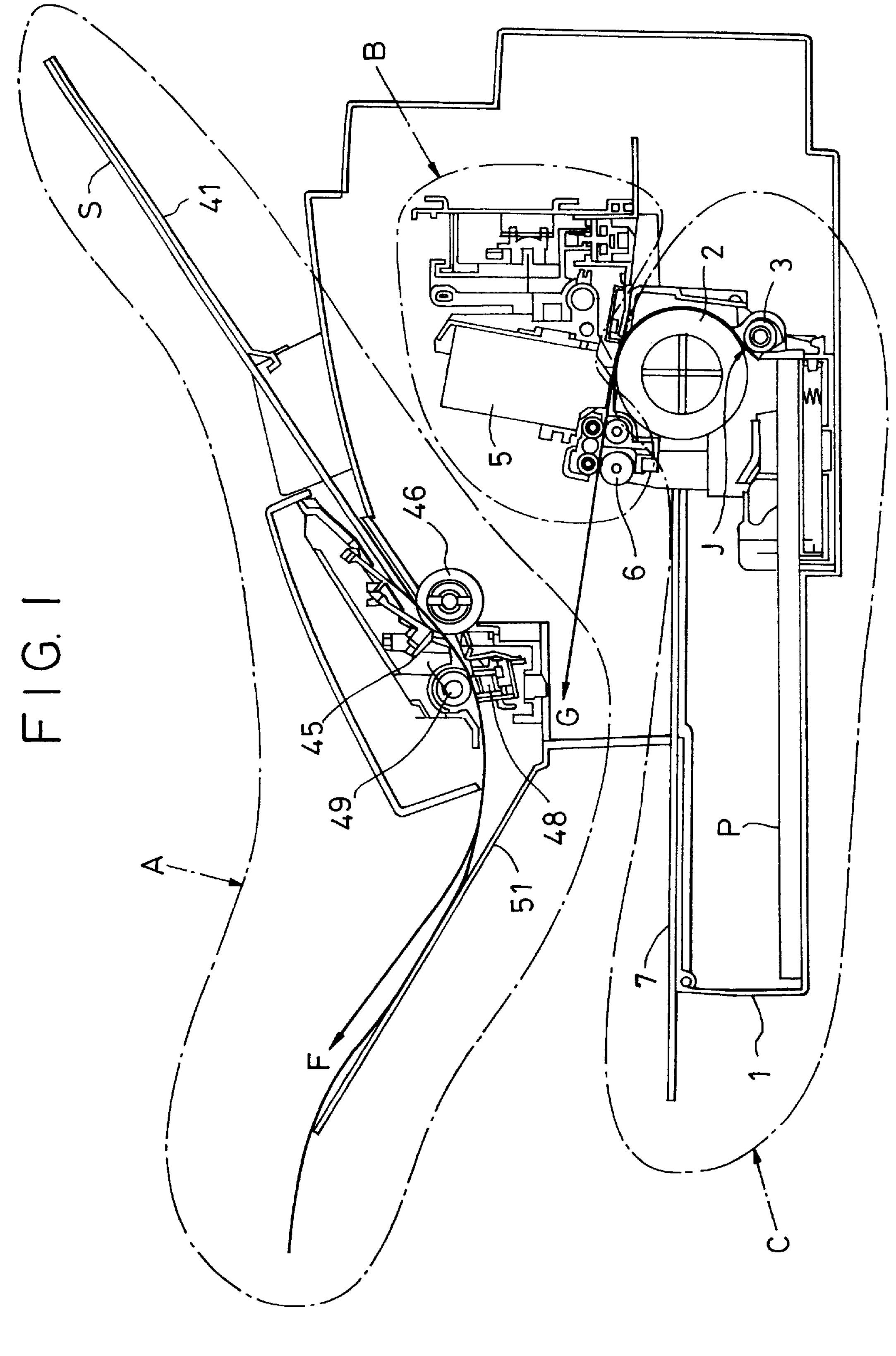
FIG. 1 is a sectional view of a facsimile apparatus incorporating an embodiment of the present invention.

Referring first to FIG. 1 schematically showing the construction of a facsimile apparatus incorporating an embodiment of the present invention, the facsimile apparatus has a reading unit A for optically reading an original, a recording unit B which is an ink jet recording apparatus embodying the present invention, and a sheet feed unit C having a sheet cassette which carries a stack of sheets such as recording paper sheets and adapted for feeding the sheets successively separated from the stack.

A description will be given first as to the manner in which original sheets S are fed and conveyed along an original sheet conveyance path indicated by an arrow F. The reading unit A has an original sheet tray 41 which carries a stack of original sheets S facing downward. The original sheets S are successively separated from the stack one-by-one starting from the lowermost sheet by means of a separator member 45 which cooperates with a separator roller 46. The original sheet thus separated is conveyed by the separator roller 46 to a reading position where a reading sensor 48 is disposed. The reading sensor 48 is a line sensor having a light source and a multiplicity of photoelectric converting elements which are arrayed along a line over the entire width of a main-scan which is to be performed for reading the image on the original sheet. Numeral 49 designates a white roller which serves to prevent the original sheet from *floating away from the reading sensor 48 while performing feed and discharge of the original sheet S in the direction of a sub-scan. Successive sheets thus discharged are stacked on a discharged sheet original tray 51. The separator roller 46 and the white roller 49 are driven by a reader motor which is not shown.

Meanwhile, the recording paper sheets P are conveyed along a path indicated by an arrow G. More specifically, the recording paper sheets P stacked on the sheet feed tray 1 of the sheet feed unit C are picked up one-by-one by cooperation between a sheet feed roller 2 and a retard roller 3, and the recording paper sheet thus picked up is fed into the recording unit B by the sheet feed roller 2. A recording head 5 serving as recording means perform recording on the recording paper sheet fed into the recording unit B. The recording paper sheet, after travelling a certain distance within the apparatus, is ejected by an ejection roller 6 serving as ejecting means onto an ejected sheet stacker 7 serving as ejected sheet stacking means. Successive sheets ejected after recording are thus stacked on the ejected sheet stacker 7.

A description will now be given of the construction of a recording portion in the recording unit B, with specific reference to FIG. 2. A head cartridge 5, as an example of the "recording portion" of the apparatus in accordance with the present invention, mounts an ink jet recording head having an ink tank (ink containing portion). The whole ink jet recording head inclusive of the ink tank is replaceable with an unused, i.e., new, head when the ink in the ink containing portion has been consumed.

There are two types of head cartridges 5 usable on the facsimile apparatus: a black recording cartridge and a color recording cartridge which are replaceable with each other as desired. The black recording cartridge, capable of recording at a resolution of 360 DPI, has a nozzle array consisting of 128 nozzles, each nozzle communicating with an ink channel having an electro-thermal transducer which generates heat to cause film boiling of the ink, the resultant pressure rise displaces the ink in the ink channel so as to discharge a droplet of ink from the nozzle. The color recording cartridge also has an array of nozzles including 64 nozzles for black ink, and 24 nozzles for each of yellow, cyan and magenta color inks. The configuration and dimensions of the color recording cartridge are the same as those of the black recording cartridge. The volume of each color ink held in the color recording cartridge is ¼ or less of the black ink volume holdable in the black recording cartridge.

A carriage 15 is operable to reciprocately move the head cartridge 5 in the main-scan direction which is indicated by an arrow H and which is perpendicular to the sub-scan direction, i.e., direction of feed of the recording paper sheet P, indicated by an arrow G, while precisely holding the head cartridge 5. To this end, the carriage 15 is slidably held by a guide bar 16 and an abutting portion 15*a*. Output power of a carriage motor (not shown) is transmitted to the carriage through a pulley 17 and a timing belt 18 so as to cause the reciprocating motion of the carriage 15, During the running of the cartridge, electrical power and recording signals are delivered to the head cartridge 5 from electrical circuits on the main part of the recording apparatus via a flexible cable 19. The head cartridge 5 has electrical terminals which are adapted to be press-fitted to mating terminals on the flexible cable 19, thus achieving electrical connections. A CPU which will be mentioned later can distinguish the type of cartridge mounted on the recording apparatus, i.e., whether the mounted cartridge is a black recording cartridge or the color recording cartridge, based on whether a circuit between a specific pair of terminals on the cartridge is closed or opened after connection to the flexible cable.

Numeral 20 designates a cap which functions as an ink receiving means. The cap 20 is positioned so as to be engageable with the recording head 5 when the carriage 15 has been moved to and is stationed at a home position, and is movable between an elevated position and a lowered position. The cap 15, when set in the elevated position, closely contacts with the recording head so as to cover the nozzles, thereby preventing evaporation of ink from the nozzles and contamination of the nozzles with foreign matters.

In order that the head cartridge 5 at the home position and the cap 20 are correctly positioned relative to each other, the illustrated embodiment employs a carriage home sensor 21 provided on the main part of the apparatus and a light-shield plate 15*b* provided on the carriage 15. The carriage home sensor 21 incorporates a transmissive-type photo-interrupter. When the carriage 15 has been moved to a predetermined home position, a light beam emitted from a part of the carriage home sensor 21 is interrupted by the shield plate 15*b* so that the fact that the head cartridge 5 has been moved into alignment with the cap 20 is detected based on the level of the output from the carriage home sensor 21.

Figure 2:
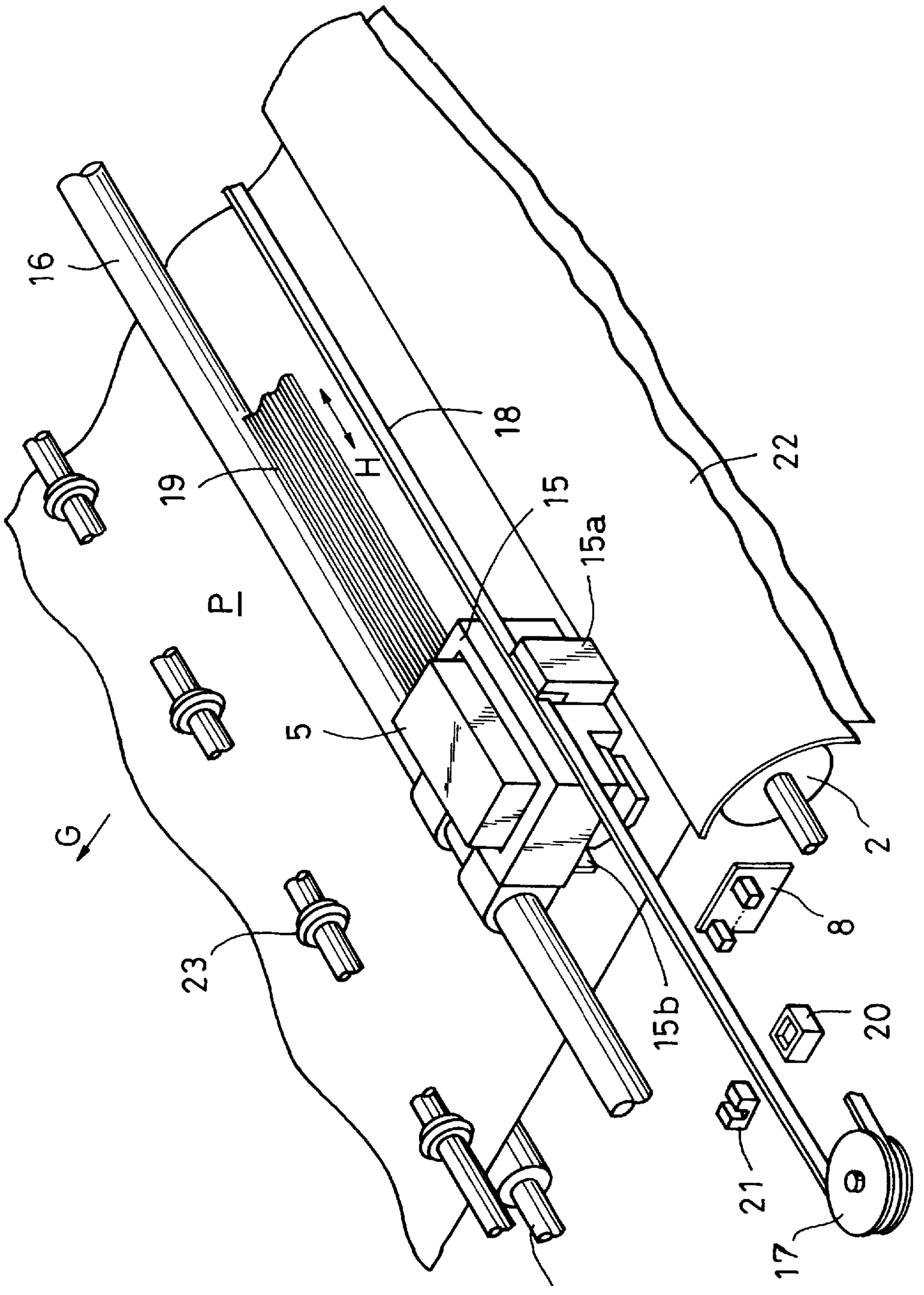
FIG. 2 is an enlarged perspective view of a recording portion.

The recording paper sheet P is fed upward from a lower position as viewed in FIG. 2 and is deflected by the sheet feed roller 2 and a sheet guide 22 so as to run in a horizontal direction which is the aforementioned sub-scan direction indicated by the arrow G. The sheet feed roller 2 and the sheet ejection roller 6 are driven by a recorder motor which is not shown, so as to feed and convey the recording paper sheet P at a high degree of precision in relation to the reciprocating motion of the carriage 15. The recording apparatus has a plurality of spurs 23 each being made of a highly water-repellent material and having a disk-like form with a thin blade-like peripheral edge. Each spur 23 is adapted to contact with the surface of a recording paper P sheet only at the thin blade-like peripheral edge thereof. These spurs 23 are rotatably carried by bearing members (not shown) and are disposed at a predetermined interval in the direction of the main scan so as to oppose the above-mentioned sheet ejection roller 6. These spurs 6 contact an unfixed image on the recording paper sheet P immediately after the recording but are able to guide the recording paper sheet P without causing any adverse effect on the unfixed image.

A photo-sensor 8 serving as a discharge failure detecting means is a transmissive-type photo-interrupter which is disposed at a position between the cap 20 and the recording paper sheet P in alignment with the nozzle array on the head cartridge 5 so as to optically and directly detect ink droplets discharged from the nozzles of the head cartridge 5. Any ink discharging failure such as extraordinary state of discharge from the head cartridge 5, which may be caused by, for example, clogging of the nozzles in the head cartridge 5 or insufficiency of ink remaining in the ink supply system, can be detected based on the level of the output photo-sensor 8. The photo-sensor 8 used in this embodiment includes a light-emitting element which is constituted by a red LED and has a lens formed integrally with the light-emitting surface thereof so as to project a substantially collimated light beam towards the light-receiving element. The photo-sensor 8 further includes a light-receiving element constituted by a phototransistor. A molded member provided on the light-receiving surface of the light-receiving element has a tiny hole of 0.7 mm tall and 0.7 mm wide formed in alignment with the optical axis, whereby a restricted linear detectable region of 0.7 mm tall and 0.7 mm wide is defined over the entire length between the light-emitting and light-receiving elements. The photo-sensor 8 is mounted such that the optical axis which optically couples the light-receiving element to the light-emitting element extends in parallel with the array of the nozzles of the head cartridge 5. The distance between the light-emitting element and the light-receiving element is greater than the width of the nozzle array of the head cartridge 5. When the photo-sensor 8 is correctly mounted such that the optical axis thereof extends precisely in parallel with the nozzle array, ink droplets discharged from each of the nozzles of the nozzle array intersect the above-mentioned detectable region. When droplets from nozzles fly across the detectable region, the light from the light-emitting element is interrupted so that the quantity of light reaching the light-receiving element is reduced, whereby the level of the output from the phototransistor as the light-receiving element is changed.

The aforementioned carriage home sensor 21, used as means for correctly locating the cap 20 relative to the head cartridge 5, serves also as means for correctly locating the head cartridge 5 and the photo-sensor 8 relative to each other such that the nozzle array on the head cartridge 5 is exactly aligned with the optical axis of the photo-sensor 8. The distance to be travelled by the carriage from the home position (H.P.) to the position where the nozzle array on the head cartridge 5 is aligned with the optical axis of the photo-sensor 8, in terms of the number of steps of the carriage driving stepper motor, is set as a constant value in a sequence controller. Thus, the arrangement is such that the nozzle array on the head cartridge 5 is exactly aligned with the optical axis of the photo-sensor 8 when the carriage has travelled the above-mentioned distance after detection of the home position.

Figure 3:
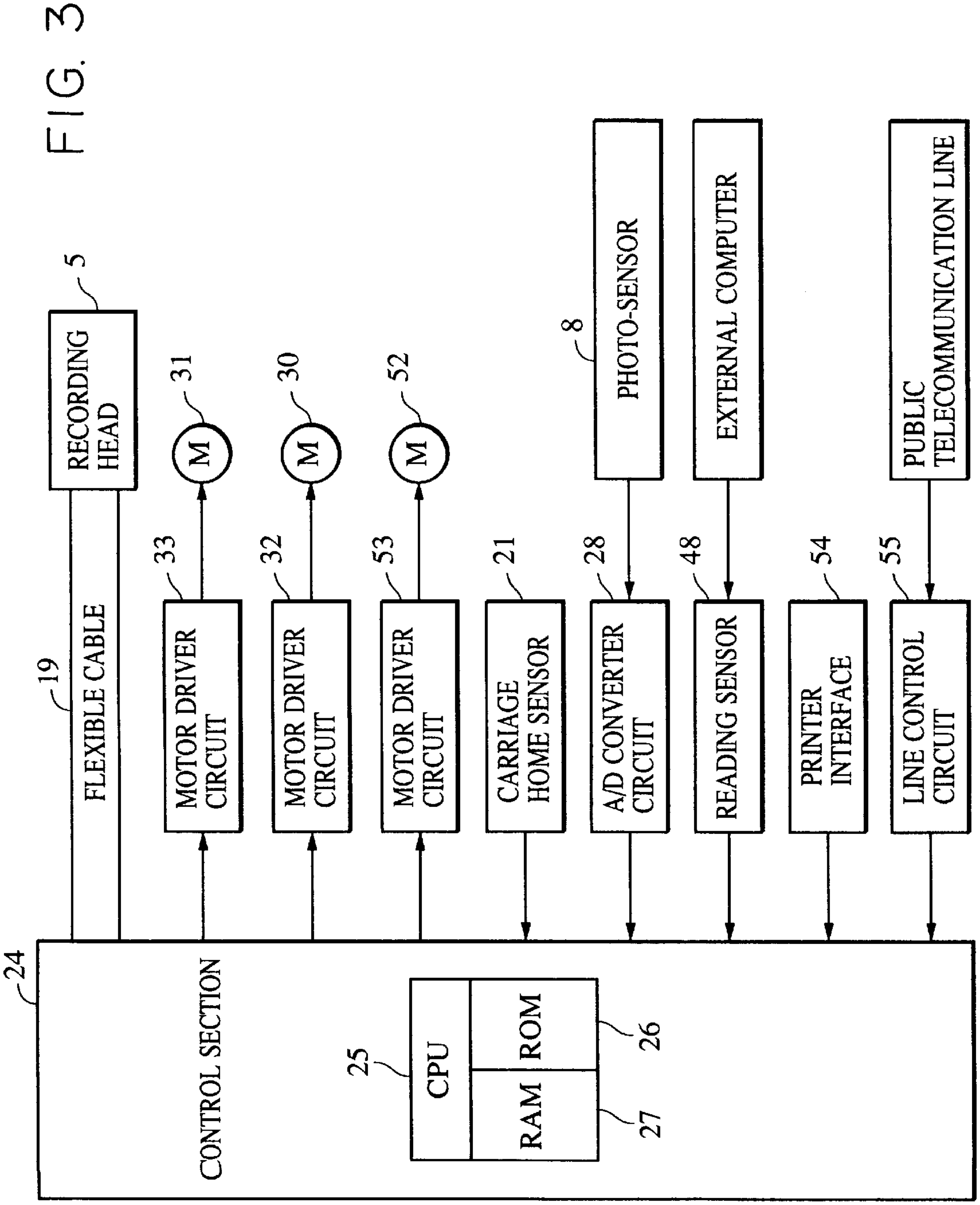
FIG. 3 is a block diagram showing the construction of the facsimile apparatus shown in FIG. 1.

Electrical circuitry of the facsimile apparatus incorporating the embodiment will be described with reference the block diagram shown in FIG. 3. A control section generally denoted by 24 performs overall control of the whole recording apparatus. The control section 24 includes a CPU 25 such as a microprocessor, a ROM 26 which stores control programs to be used by the CPU 25 and other data, and a RAM 27 which is used as a work area for the CPU 25 and also as a memory for temporarily storing various data. The head cartridge 5 is electrically connected to the control section 24 through a flexible cable 19 which carries signal lines through which various control signals are delivered from the control section to the head cartridge 5, as well as signal lines through which an identification signal identifying the type of the cartridge, i.e., whether a black recording cartridge or a color recording cartridge, is transmitted to the control section. The level of the output from the photo-sensor 8 is digitized by an A/D converter circuit 28 and is analyzed by the CPU 25. The carriage motor 30 is a stepper motor capable of producing a rotational angle output which is controllable in accordance with the number of steps, i.e., pulses, given by a motor driver circuit 32. The carriage motor 30 and the associated motor driver circuit 32 are connected to the control section 24. Similarly, the recording motor 31 and its driver circuit 33, as well as the reading motor 52 and its driver circuit 53, are connected to the control section 24. The carriage home sensor 21 also is connected to the control section 24. The following components are also connected to the control section 24: an image reading sensor 48 for reading the image of an original; a printer interface 54 through which a printing instruction is received from an external computer serving as a transmitting device which holds image data after transmission; a line control circuit 55 through which data is received, via a public telephone line, from another facsimile apparatus serving as a transmitting device which does not hold image data after transmission; and so forth. Thus, the recording apparatus is a multifunction recording apparatus which functions as a facsimile recorder which records data received from another facsimile apparatus, a copying apparatus, and a printer for printing data supplied by an external computer. For instance, the portion of the recording apparatus which performs the recording of data received from another facsimile apparatus corresponds to the first image recording means in the present invention. Thus, the portion which performs recording of image data derived from an external computer forms the second image recording means. The portion of the recording apparatus which records image data read by the original image reading sensor constitutes the original image recording means.

Figure 4:
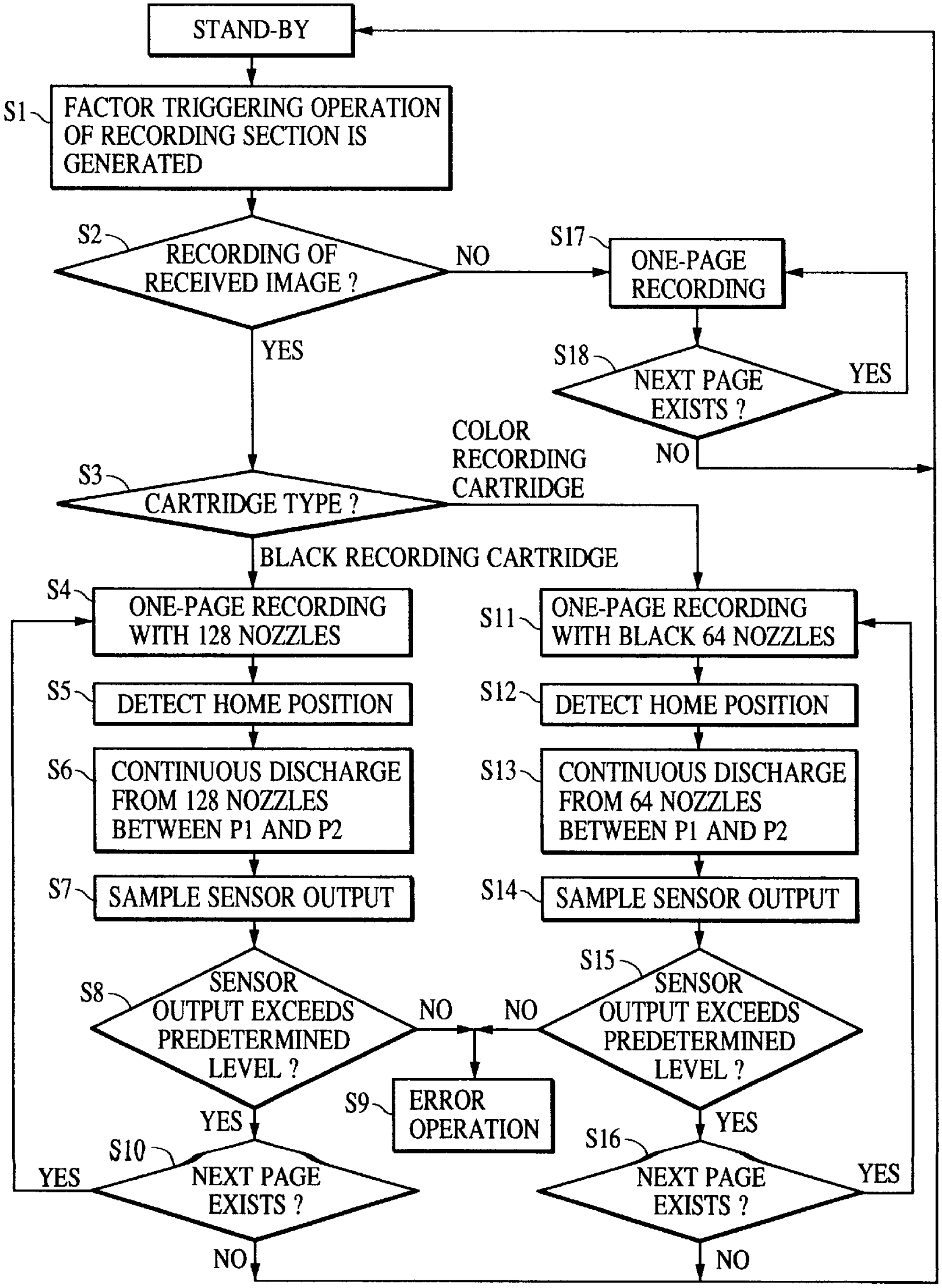
FIG. 4 is a flow chart illustrative of the operation including test discharging operation executed for the purpose of detecting any ink discharge failure.
Figure 5:
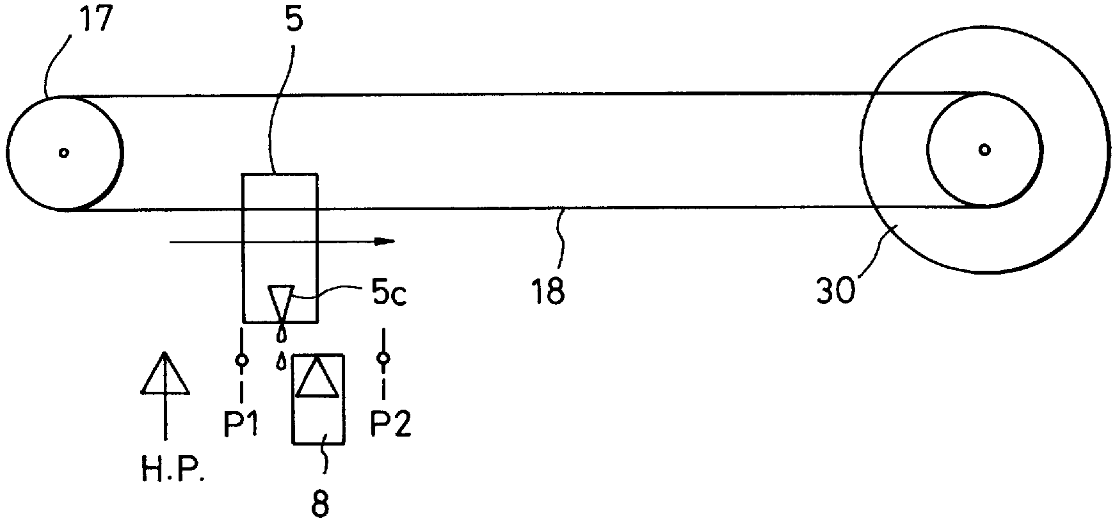
FIG. 5 is a schematic illustration of the recording portion.

In this embodiment, the CPU 25 executes a sequential control of an ink discharge failure detecting process which will be described with specific reference to FIG. 4, which is a flow chart illustrative of the process, and also to FIG. 5, which is a schematic illustration of the recording portion. A recording operation triggering factor, e.g., a copying instruction, a facsimile receiving instruction or a printing instruction from an external computer, is generated in Step S1 while the recording apparatus is in a stand-by condition. In Step S2, the CPU determines whether the recording operation triggering function is a copying instruction, facsimile receiving instruction or a printing instruction from an external computer. When the printing operation triggering factor is determined as being a facsimile receiving instruction, the process proceeds to Step S3 in which the CPU identifies the type of the cartridge, i.e., whether the cartridge is a black recording cartridge or a color recording cartridge. If the cartridge is identified as being a black recording cartridge, the process advances to Step S4 in which a recording paper sheet P is picked up and recording of image on one page is conducted by using the 128 nozzles of the black recording cartridge. In the subsequent Step S5, the carriage 15 is reciprocately moved so that the home position, which is the absolute position of the carriage 15, is detected by means of the carriage home sensor. The process then advances to Step S6 in which the carriage is moved at a constant velocity (about 300 mm/sec) from the home position and ink is jetted from all the 128 nozzles of the head at a frequency of 6 kHz, while the carriage is moving through a region between a predetermined position P1 which is about 2 mm before the position at which the nozzle array 5*c* of the head is aligned with the optical axis of the photo-sensor 8 and a predetermined position P2 which is about 2 mm beyond the position at which the nozzle array 5*c* is aligned with the optical axis of the photo-sensor 8. The number of droplets discharged from each nozzle depends on factors such as the velocity of movement of the carriage, discharge region, and so forth. In this embodiment, 80 ink droplets are discharged from each nozzle. In Step S7, the output levels of the photo-sensor 8 are sampled through an A/D converter circuit during the period of continuous discharge. In Step S8, the CPU 25 determines whether or not the data indicative of the output from the photo-sensor exceeds a predetermined level. Thus, whether or not the ink is properly discharged without fail is detected by the operation executed in Steps S4 through S8. When the sensor output data is below the predetermined level, the CPU determines that there is shortage of the ink and commences an error operation. For instance, in the case of facsimile communication, a message indicative of occurrence of an error is displayed and the recording operation is terminated, while the image data is stored in the memory. The stored memory is printed in Step S9 after the cartridge is exchanged with a new cartridge. When the level of the sensor output data is equal to or higher than the predetermined level, pick-up of the next recording paper sheet is commenced if there exists data to be recorded on the next page, and the described operation is repeated, whereas, if not, the process returns to the stand-by state (Step S10).

If the recording cartridge on the recording apparatus is judged as being a color recording cartridge in Step S3, the process skips to Step S11 in which one-page image data is recorded by using 64 nozzles for the black ink of the color recording cartridge. Then, in Step S12, the home position as the absolute position of the carriage 15 is detected as in Step S5. Then, ink is consecutively discharged in Step S13 only from the 64 black ink nozzles while the carriage is moving between the positions P1 and P2 described before in connection with Step S6. Then, sampling of the sensor outputs is conducted in Step S14, as in Step S7 described before, followed by execution of Step S15 in which the CPU determines whether or not the sensor output data exceeds a predetermined level. If the sensor output level is below the above-mentioned predetermined level, the CPU determines that there is a shortage of the ink, so that the process proceeds to Step S9 to execute the aforementioned error operation. When the sensor output data level is equal to or higher than the above-mentioned predetermined level, the process proceeds to Step S16 in which, if there is data to be printed on the next page, pick-up of the next recording paper sheet is commenced and the above-described operation is repeated, whereas, if not, the process is initialized to keep the recording apparatus in the stand-by state.

If the determination in Step S2 indicates that a recording operation triggering factor other than the facsimile receiving instruction, e.g., a copying instruction or a printing instruction from a computer, has occurred, the process skips to Step S17 in which one-page recording is executed. In this case, therefore, the detection of ink discharge failure is not conducted. The next Step S18 determines whether or not data to be printed on the next page exists. If any data to be recorded on the next page exists, an answer YES is given so that the recording operation is continued, whereas, if not, an answer NO is given to initialize the process so as to reset the recording apparatus to the stand-by condition.

Although in the foregoing description the sensor outputs are sampled at high speed through an A/D converter circuit, a comparator circuit incorporating an inexpensive operation amplifier may used in place of the A/D converter circuit so as to compare the sensor output with a predetermined threshold level, in order to detect any ink discharge failure.

Figure 6:
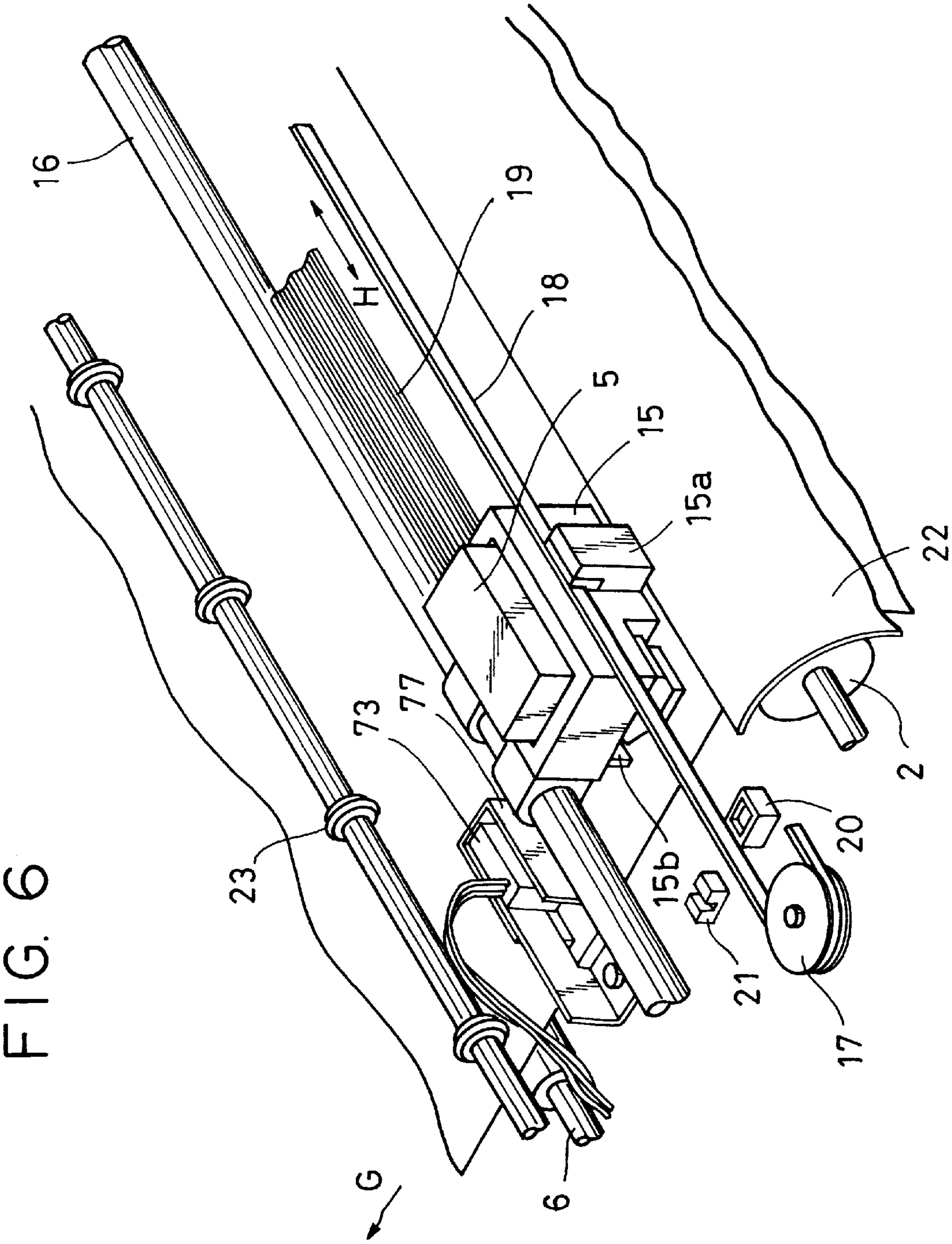
FIG. 6 is an enlarged perspective view of a recording portion of another embodiment.
Figure 7:
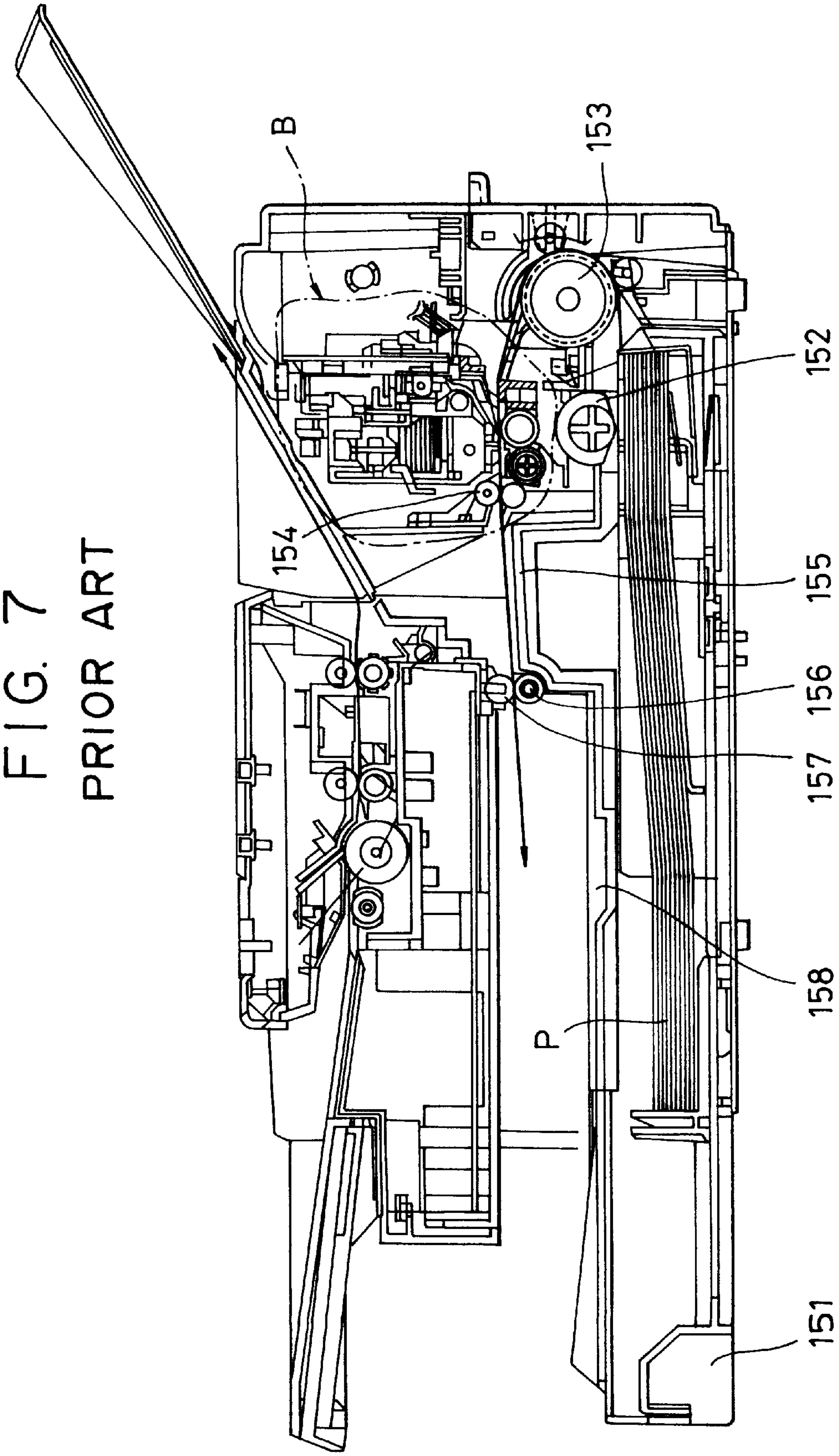
FIG. 7 PRIOR ART
FIG. 7 is a sectional view of a conventional recording apparatus.

Another embodiment of the present invention will be described with reference to FIG. 6. This embodiment differs from the first embodiment only by the construction for detecting ink discharge failure. In this embodiment, a black mark is printed on the trailing end of the recording paper sheet after completion of the recording on this sheet, and whether or not the black mark has been correctly formed is optically detected by a reflection-type photo-sensor 73. Thus, whether or not any discharge failure has occurred is determined based on the level of the output from the photo-sensor 73 indicative of the quantity of light reflected by the black mark. The photo-sensor 73 used in this embodiment has a red LED serving as a light-emitting element and a photo-transistor serving as a light-receiving element, and is capable of discriminating between white and black of a tiny region of, for example, 3 mm diameter.

The use of the red LED as the light source of the light-emitting element involves a risk of erroneous operation of the apparatus due to, for example, influence of solar light. The embodiment shown in FIG. 6 therefore employs a light-shield plate so as to avoid such an erroneous operation. In each of the described embodiments, the recording portion employs a head cartridge having a recording head and an ink tank or tanks integrated with each other. This, however, is only illustrative and the invention does not exclude the use of a recording head which is separate from an ink tank and connected to the ink tank when used on the recording apparatus.

A description will now be given of the principle of ink discharging operation performed by the ink jet recording head used as the recording means in the present invention. In general, the recording head unit used in an ink jet recording apparatus has a multiplicity of fine orifices serving as ink discharge outlets, and liquid channels leading to the orifices. Each channel has an energy affecting zone and is associated with energy generating means for generating energy which affects the liquid in the energy affecting zone to form liquid droplets.

The energy generating means may be of the type incorporating an electro-mechanical transducer such as a piezoelectric element, a laser which applies electromagnetic waves to the liquid to cause the liquid to absorb and generate heat which serves to discharge and jet liquid droplets, or an electro-thermal transducer which directly heats the liquid to discharge the liquid droplets. Among various types of ink jet recording heads, particularly advantageous is a recording head of the type which makes use of thermal energy as the energy for discharging droplets of the liquid, because this type of head allows a high density arrangement of orifices from which flying recording liquid droplets are jetted, thus offering a high resolution of the recorded image.

The recording head of the type which employs an electro-thermal transducer as the energy generating means can be easily fabricated to have a compact construction and an elongated or planar, i.e., two-dimensional, arrangement also can be achieved without difficulty, by making full use of advantages of IC technologies and micro-processing techniques which recently have achieved remarkable progress, as well as remarkable improvement in reliability, in the field of semiconductor production. With this type of recording head, therefore, a multi-nozzle structure, as well as a high mounting density of nozzles, can easily be obtained with good mass-producibility and at reduced production costs.

The ink jet recording head employing electro-thermal transducers as the energy generating means and produced by a semiconductor production process generally has liquid channels corresponding to the orifices, i.e., ink discharge openings, and the electro-thermal transducers are activated selectively and independently to apply thermal energy to the liquid filling the associated channels, thereby discharging the liquid in the form of flying droplets from the discharge openings leading from the channels. The liquid channels are supplied with the liquid from a common liquid chamber.

The ink discharge portion of this type of ink jet recording head can advantageously be produced by the following process. This production process has the steps of successively laminating, on a first substrate, a solid layer for forming at least liquid channels, a layer curable by active energy rays for forming at least walls of the channels, and a second substrate; laminating a mask on the second substrate; applying active energy rays from the upper side of the mask so as to cure at least the portions of the curable material layer which are to form the channel walls; and removing the solid layer and the uncured portion of the curable material layer from the space between the two substrates, thereby forming at least the liquid channels. As to the details of this process, reference is made to Japanese Patent Laid-Open Application No. 62-253457.

The present invention offers superior effects particularly when embodied in the form of an ink jet recording apparatus of the type which performs recording with jetted ink droplets formed by using thermal energy.

Typical construction and principle of such type of recording apparatus follows basic theory as disclosed in, for example, U.S. Pat. Nos. 4,723,129 and 4,740,796. The above-described theory can be realized both in on-demand and continuous operation types of apparatuses. In particular, the theory can effectively be practiced in on-demand type apparatus having electrothermal transducers arranged in a sheet or ink channels holding ink, wherein at least one drive signal is applied to a selected transducer in accordance with the information to be recorded, so that a rapid temperature rise occurs due to heat generated by the transducer so as to cause a film boiling of the ink on the heating surface of the recording head, thus generating a bubble in the liquid (ink) in response to each drive signal. The liquid (ink) is forced out of an ejection opening in the head as a result of growth and contraction of the bubble, thus forming at least one droplet. Supply of the drive signal in the form of a discrete pulse is preferred, since it enables minute control of growth and contraction of the bubble, thus achieving superior response of liquid (ink) ejection to the input signal.

Pulse drive signals such as those shown in U.S. Pat. Nos. 4,463,359 and 4,345,262 are preferably used. Further improvement in recording quality is attainable with the use of conditions disclosed in U.S. Pat. No. 4,313,124 directed to the rate of temperature rise of the heating surface mentioned above.

As to the construction of the recording head, it is possible to use various combinations of the ejection openings, liquid channels and electrothermal transducers, with straight or orthogonal channels, such as those disclosed in the above-mentioned U.S. patents, as well as the arrangements employing heating portions disposed in curved regions as disclosed in U.S. Pat. Nos. 4,558,333 and 4,459,600.

The arrangement also may be such that a single slit is used as a discharge portion which is common to a plurality of electro-thermal transducers, as disclosed in Japanese Patent Laid-Open Application No. 59-123670, or such that an aperture for absorbing impulse waves of thermal energy is arranged corresponding to the discharge portion, as disclosed in Japanese Patent Laid-Open Application No. 59-138461. Thus, the present invention makes it possible to securely and efficiently perform the recording irrespective of the type of the ink jet recording head.

The recording apparatus to which the present invention is applied may have a full-line type recording head having a length corresponding to the maximum width of recording achievable by the recording apparatus. In such a case, the recording head may be constituted by a plurality of recording head sections adjoined to provide the full-line length or may be a single, integral, elongated recording head.

The recording head to be used in the invention may be an exchangeable chip-type recording head which, when mounted on a recording apparatus, completes electrical connection to the recording apparatus, as well as the path of receiving ink from the recording apparatus.

Provision of a recovery means and/or supplementary or auxiliary means on the recording head is preferred, because such means further stabilizes the effect produced by the invention. Examples of such means are a capping means for capping the recording head, pressurizing or suction means, preparatory heating means constituted by the electro-thermal transducers or heater elements different from the electro-thermal elements or combination thereof, or means which enables preparatory ink discharge prior to the discharge of the recording ink droplets.

The recording apparatus of the present invention may be of the type which has at least one of multi-color mode constituted by a plurality of colors and a full-color mode which employs mixing of colors.

In the foregoing description of the embodiment, the ink has been described as being in liquid phase. The ink, however, may be of a type which is solid at temperatures below the room temperature but is softened or liquefied at temperatures above the room temperature. Thus, it suffices only that the ink is in liquid phase when it is discharged in response to recording signals.

In addition, the present invention can be carried out by using an ink which is liquefied only when thermal energy is applied thereto. For instance, the ink may be of such a type that absorbs energy during phase change from solid to liquid so as to prevent undesirable rise of ink temperature or an ink which when shelved is solidified so as not to evaporate. Thus, the invention can be realized in the form of an ink which is liquefied when thermal energy is applied thereto in response to the recording signal so as to be discharged as liquid ink, or an ink which starts to solidify upon reaching a recording medium. When one of these types of ink is used, the ink may be held so as to face an electro-thermal transducer, by being retained in liquid or solid phase in pores or through holes in a porous sheet as disclosed in Japanese Patent Laid-Open Application Nos. 54-56847 and 60-71260. The inks mentioned above can be most effectively utilized in the present invention when ink ejection relies upon film boiling phenomenon mentioned before.

As will be understood from the foregoing description, according to the present invention, it is possible to reduce the amount of ink to be used in the test discharging operation which is conducted for the purpose of detecting any ink discharge failure, thus reducing also the running cost and prolonging the interval of exchange of the cartridge.

The individual components shown in outline or designated by blocks in the drawings are well-known in the image recording arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink jet recording apparatus having a recording portion which performs recording by discharging at least one of black ink and a color ink of a color other than black onto a recording medium, comprising:

discharge failure detecting means for executing a detecting operation by detecting any abnormality in a state of ink discharge from the recording portion;

determining means for determining whether the recording portion is in a first state for performing the recording operation by using the black ink alone or the recording portion is in a second state for performing the recording operation by using at least the color ink of the color other than black; and control means for controlling the discharge failure detecting means to execute the detecting operation when said determining means determines that the recording portion is in the first state, while prohibiting execution of the detecting operation when said determining means determines that the recording portion is in the second state.

2. An ink jet recording apparatus according to claim 1, further comprising a recording portion mounting section for selectively mounting one of a black recording portion which discharges the black ink and a color recording portion which discharges the black ink and at least one color ink of a color other than black.

3. An ink jet recording apparatus according to claim 2, wherein said control means, upon determining that the recording portion is in a mode for performing the recording based on image data transmitted from a device which does not store the image data after transmission, executes a determination as to whether the recording portion mounted on said recording portion mounting section is the black recording portion or the color recording portion, said control means, upon determining that the recording portion mounted on said recording portion mounting section is the black recording portion, controlling said discharge failure detecting means to execute the discharge failure detecting operation and, upon determining that the recording portion mounted on said recording portion mounting section is the color recording portion, controlling said discharge failure detecting means to execute the discharge failure detecting operation by using only black ink from the color recording portion.

4. An ink jet recording apparatus according to claim 3, wherein said control means controls said discharge failure detecting means such that said discharge failure detecting means executes the detecting operation after the recording portion has performed recording based on the image data.

5. An ink jet recording apparatus according to claim 3, wherein said control means controls said discharge failure detecting means so as to prohibit execution of the detecting operation, upon determining that the recording mode is a mode different from the mode for performing the recording based on image data transmitted from a device which does not store the image data after the transmission.

6. An ink jet recording apparatus according to claim 2, wherein both the black recording portion and the color recording portion comprise ink containing portions, the ink containing capacity of the ink containing portion of the color recording portion for the ink of each color is smaller than that for the black ink in the black recording portion.

7. An ink jet recording apparatus according to claim 5, further comprising:

receiving means for receiving the image data transmitted from the device which does not store the image data after the transmission;

image data recording means for driving the recording portion mounted on said recording portion mounting section in accordance with the image data received by said receiving means thereby performing the recording based on the image data;

original image reading means for reading an image of an original; and original image recording means for driving the recording portion mounted on said recording portion mounting section in accordance with the original image read by said original image reading means thereby performing the recording based on the original image;

wherein, when the recording mode is the mode for performing the recording based on the image data transmitted from the device which does not store the image data after the transmission, the recording is performed by said image data recording means, whereas, when the recording mode is a mode which performs the recording based on the original image read by said original image reading means, the recording is performed by said original image recording means.

8. An ink jet recording apparatus according to claim 5, further comprising:

first receiving means for receiving image data transmitted from a first device which does not store the image data after the transmission;

first image data recording means for driving the recording portion mounted on said recording portion mounting section in accordance with the image data received by said first receiving means thereby performing the recording based on the image data;

second receiving means for receiving image data transmitted from a second device which stores the image data after the transmission; and second image data recording means for driving the recording portion mounted on said recording portion mounting section in accordance with the image data received by said second receiving means thereby performing the recording based on the image data wherein, when the recording mode is a mode for performing the recording based on the image data transmitted from the first device which does not store the image data after the transmission, the recording is performed by said first image data recording means, whereas, when the recording mode is a mode which performs the recording based on the image data transmitted from the second device which stores the image data after the transmission, the recording is performed by said second image data recording means.

9. An ink jet recording apparatus according to claim 8, wherein the first device comprises a facsimile apparatus.

10. An ink jet recording apparatus according to claim 8, wherein the second device comprises a computer.

11. An ink jet recording apparatus according to claim 1, wherein the recording portion comprises a thermal energy generator for generating thermal energy to be supplied to the ink so as to discharge the ink.

12. An ink jet recording apparatus according to claim 1, wherein the recording portion comprises a head cartridge comprising an integrated recording head and ink containing portion.

13. An ink jet recording apparatus for recording on a recording medium by using at least a color recording portion which discharges black ink and a color ink of a color other than black onto the recording medium, comprising:

receiving means for receiving image data transmitted from a device which does not store the image data after transmission, the image data representing an image;

image data recording means for driving the color recording portion based on the image data received by said receiving means, thereby performing the recording in a recording operation;

determining means for determining whether or not a recording mode is a mode for performing recording of the transmitted image data by said image data recording means; and control means for controlling the recording operation such that, when said determining means has determined that the recording mode is the mode for performing recording by said image data recording means, the recording operation by said image data recording means is executed by causing the color recording portion to discharge the black ink alone.

14. An ink jet recording apparatus according to claim 13, further comprising:

a recording portion mounting section for selectively mounting one of a black recording portion which discharges black ink onto the recording medium and the color recording portion; and discriminating means for discriminating whether the recording portion mounted on said recording portion mounting section is the black recording portion or the color recording portion wherein, when said determining means has determined that the recording mode is the mode for performing the recording by said image data recording means, said discriminating means discriminates whether the recording portion mounted on said recording portion mounting section is the black recording portion or the color recording portion, and, when said discriminating means has discriminated that the mounted recording portion is the black recording portion, said control means drives said image data recording means to execute the recording by the black ink discharged from the black recording portion, whereas, when said discriminating means has discriminated that the mounted recording portion is the color recording portion, said control means drives said image data recording means to execute the recording by causing the color recording portion to discharge black ink alone.

15. An ink jet recording apparatus according to claim 14, further comprising:

discharge failure detecting means for detecting any abnormality in a state of ink discharge from the mounted recording portion;

wherein said control means, after driving said image data recording means to execute the recording with the black ink discharged from the black recording portion, activates said discharge failure detecting means causing the black recording portion to discharge the black ink to enable detection of any abnormality in the state of discharge of the black ink, and wherein said control means, after driving said image data recording means to execute the recording by causing the color recording portion to discharge the black ink alone, activates said discharge failure detecting means causing the color recording portion to discharge the black ink alone to enable detection of any abnormality in the state of discharge of the ink.

16. An ink jet recording apparatus according to claim 14, wherein the mounted recording portion comprises a thermal energy generator for generating thermal energy to be supplied to the ink so as to discharge the ink.

17. An ink jet recording apparatus according to claim 1, wherein said discharge failure detecting means comprises a sensor for detecting flying ink droplets ejected form the recording portion.

18. An ink jet recording apparatus according to claim 1, wherein said discharge failure detecting means comprises a sensor for detecting ink deposited on the recording medium.

19. An ink jet recording apparatus according to claim 15, wherein said discharge failure detecting means comprises a sensor for detecting flying ink droplets ejected from the mounted recording portion.

20. An ink jet recording apparatus according to claim 15, wherein said discharge failure detecting means comprises a sensor for detecting ink deposited on the recording medium.

21. An ink jet recording apparatus comprising:

mounting means for mounting a recording device for effecting ink jet recording;

detecting means for detecting discharge failure of the recording device, mounted on said mounting means, in a detecting operation; and control means for controlling the detecting operation, wherein said control means controls the mounted recording device to eject only black ink during the detecting operation, regardless of whether the mounted recording device is a black recording device for ejecting black ink or a color recording device for ejecting black ink and at least one other ink of a color other than black.

22. An ink jet recording apparatus according to claim 21, wherein said detecting means comprises a sensor for detecting flying ink droplets ejected from the mounted recording device.

23. An ink jet recording apparatus according to claim 21, wherein said detecting means comprises a sensor for detecting ink deposited on a recording medium.

24. .An ink jet recording apparatus according to claim 21, further comprising means for receiving recording data to be recorded by the mounted recording device, wherein if said receiving means receives data from an external device that can store the recording data, said control means controls said detecting means to not effect the detecting operation.

25. An ink jet recording method comprising the steps of:

effecting ink discharge from a mounted recording device;

detecting discharge failure of the mounted recording device in a detecting operation; and controlling the detecting operation, wherein the mounted recording device is controlled to eject only black ink during the detecting operation, regardless of whether the mounted recording device is a black recording device for ejecting black ink or a color recording device for ejecting black ink and at least one other ink of a color other than black.

26. An ink jet recording method according to claim 25, further comprising the step of receiving recording data to be recorded by the mounted recording device, wherein if recording data from an external device that can store the recording data is received, the detecting operation in said detecting step is not executed.

27. An ink jet recording apparatus having a recording portion which has a first discharge portion discharging black ink and a second discharge portion discharging a color ink of a color other than black onto a recording medium, comprising:

discharge failure detecting means for executing a detecting operation by detecting any abnormality in a state of ink discharge from the recording portion;

discriminating means for discriminating whether a recording operation is in a black recording mode performing recording using the block ink alone; and control means for controlling said discharge failure detecting means to execute the detecting operation by discharging only black ink from the first discharge portion when said discriminating means discriminates that the recording operation is in the black recording mode.

28. An ink jet recording apparatus according to claim 27, wherein the black recording mode is a facisimile recording mode.

29. An ink jet method using a recording portion which has a first discharge portion discharging black ink and a second discharge portion discharging a color ink of a color other than black onto a recording medium, comprising the steps of:

effecting ink discharge from the recording portion; and performing a discharge failure detecting operation by detecting any abnormality in a state of ink discharge from the recording portion;

wherein the discharge failure detecting operation is performed by discharging only black ink from the first discharge portion when a recording operation is performed using the black ink alone.

30. An ink jet recording apparatus having a recording portion which performs recording by discharging ink onto a recording medium in a recording mode selected from the group comprised of a first mode for recording as a facsimile machine, a second mode for recording as a copying machine and a third mode for recording based on image data transmitted from an external computer, comprising:

discriminating means for discriminating a selected recording mode;

discharge failure detecting means for executing a detecting operation by detecting any abnormality in a state of ink discharge from the recording portion; and control means for controlling said discharge failure detecting means to execute the detecting operation only when the selected recording mode discriminated by said discriminating means is the first mode.

31. An ink jet recording apparatus according to claim 30, wherein the recording portion has a first discharge portion discharging black ink and a second discharge portion discharging a color ink of a color other than black, and said control means controls said discharge failure detecting means to execute the detecting operation by discharging only black ink from the first discharge portion when the first mode is performed using the black ink alone.

32. An ink jet recording method using a recording portion which performs recording by discharging ink onto a recording medium, a recording operation is performed in a recording mode selected from the group comprised of a first mode for recording as a facsimile machine, a second mode for recording as a copying machine and a third mode for recording based on image data transmitted from an external computer, comprising the steps of:

discriminating a selected recording mode; and executing a discharge failure detecting operation by detecting any abnormality in a state of ink discharge from the recording portion, wherein the discharge failure detecting operation is executed only when the selected recording mode discriminated in said discriminating step is the first mode.

33. An ink jet recording method according to claim 32, wherein the recording portion has a first discharge portion discharging black ink and a second discharge portion discharging a color ink of a color other than black, and said discharge failure detecting operation is executed by discharging only black ink from the first discharge portion when the first mode is performed using the black ink alone.

34. An ink jet recording apparatus having a recording portion which performs recording by discharging ink onto a recording medium in a recording mode selected from the group comprised of a first recording mode for recording image data transmitted from a second external apparatus which does not store image data after image data transmission is completed and a second recording mode for recording image data transmitted from a second external apparatus which stores image data after image data tranmission is completed, comprising:

discriminating means for discriminating a selected recording mode;

discharge failure detecting means for executing a detecting operation by detecting any abnormality in a state on ink discharge from the recording portion; and control means for controlling said discharge failure detecting means to execute the detecting operation only when the selected recording mode discriminated by said discriminating means is the first recording mode.

35. An ink jet recording apparatus according to claim 34, wherein the recording portion has a first discharge portion discharging black ink and a second discharge portion discharging a color ink of a color other than black, and said control means controls the discharge failure detecting means to execute the detecting operation by discharging only black ink from the first discharge portion when the first recording mode is performed using the black ink alone.

36. An ink jet recording method using a recording portion which performs recording by discharging ink onto a recording medium, a recording operation is performed in a recording mode selected from the group comprised of a first recording mode for recording image data transmitted from a first external apparatus which does not store image data after image data transmission is completed and a second recording mode for recording image data transmitted from a second external apparatus which stores image data after image data transmission is completed, comprising the steps of:

discriminating a selected recording mode; and executing a discharge failure detecting operation by detecting any abnormality in a state of ink discharge from the recording portion, wherein the discharge failure detecting operation is executed only when the selected recording mode discriminated in said discriminating step is the first mode.

37. An ink jet recording method according to claim 36, wherein the recording portion has a first discharge portion discharging black ink and a second discharge portion discharging a color ink of a color other than black, and said discharge failure detecting operation is executed by discharging only black ink from the first discharge portion when the first recording mode is performed using the black ink alone.

* * * * *

UNITED STATES PATENT AND TRADEMARK OFFICE

CERTIFICATE OF CORRECTION

PATENT NO. : 6,130,682

DATED : October 10, 2000

INVENTOR(S) : KOHNO ET AL.

It is certified that error appears in the above-identified patent and that said Letters Patent is hereby corrected as shown below:

[56] References Cited:
FOREIGN PATENT DOCUMENTS, --62-253457 11/1987 Japan-- should be inserted.

COLUMN 1:
Line 39, "carriage" should read --cartridge--.
Line 42, "carriage" should read --cartridge--.

COLUMN 2:
Line 21, "light receiving" should read --light-receiving--.
Line 30, "intersects" should read --intersect--.

COLUMN 3:
Line 44, "recoring" should read --recording--.

COLUMN 5:
Line 37, "*floating" should read --floating--.
Line 51, "perform" should read --performs--.

COLUMN 6:
Line 18, "reciprocately move" should read --reciprocate--.

COLUMN 8:
Line 6, "reference the" should read --reference to the--.

COLUMN 9:
Line 10, "reciprocately moved" should read --reciprocated--.

COLUMN 10:
Line 19, "may used" should read --may be used--.

UNITED STATES PATENT AND TRADEMARK OFFICE

CERTIFICATE OF CORRECTION

PATENT NO. : 6,130,682

DATED : October 10, 2000

INVENTOR(S) : KOHNO ET AL.

It is certified that error appears in the above-identified patent and that said Letters Patent is hereby corrected as shown below:

COLUMN 16:
Line 34, "form" should read --from--.

COLUMN 17:
Line 1, "24. .An" should read --24. An--.
Line 35, "block" should read --black--.
Line 43, "facisimile" should read --facsimile--.

COLUMN 18:
Line 42, "second" should read --first--.
Line 51, "state on" should read --state of--.

Signed and Sealed this

Twenty-fourth Day of April, 2001

*Attest:*

Nicholas P. Godici

NICHOLAS P. GODICI

*Attesting Officer*

*Acting Director of the United States Patent and Trademark Office*